June 26, 1962  T. E. McDOWELL  3,041,028
TRAILER HITCH
Filed March 28, 1960  4 Sheets-Sheet 1
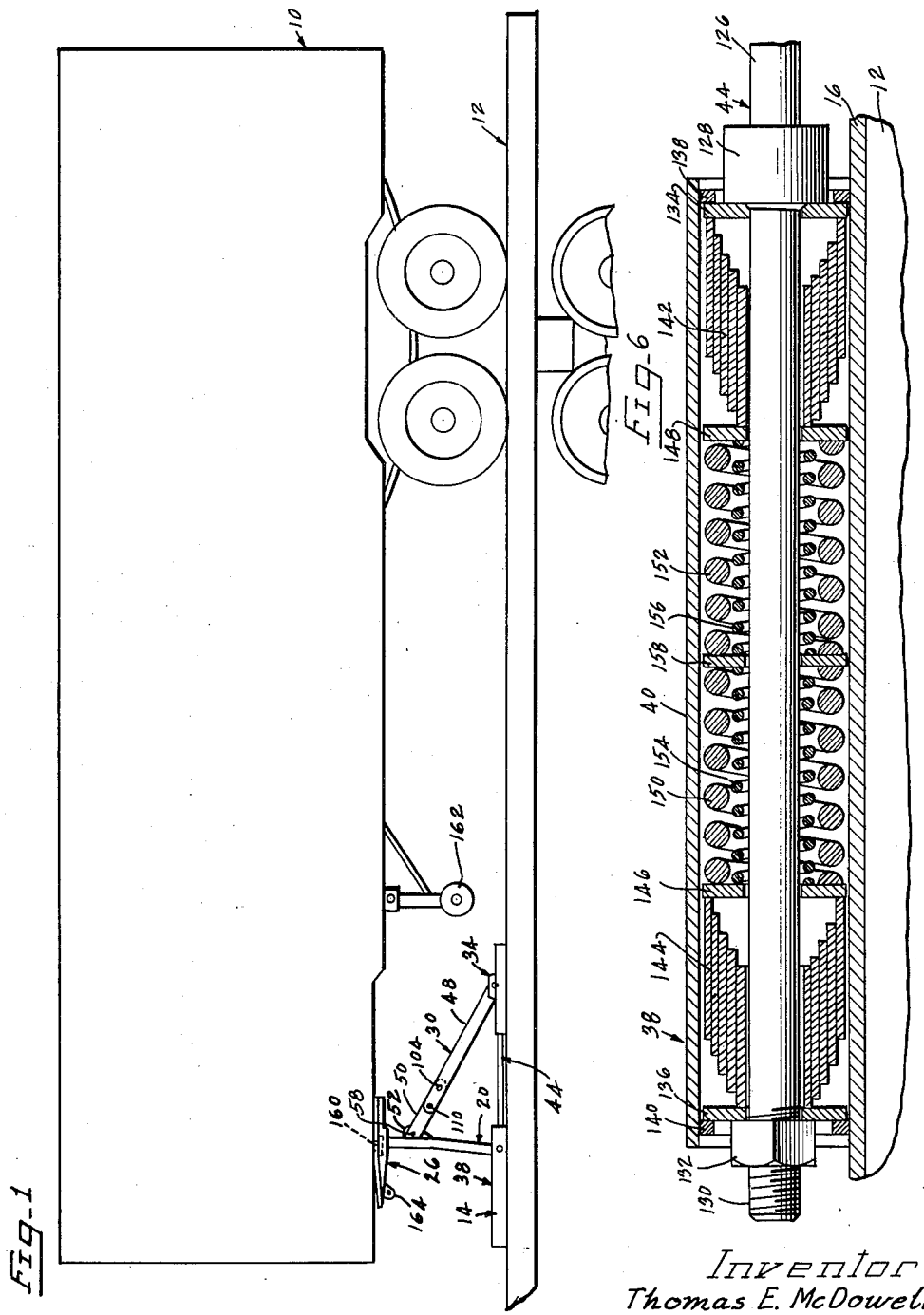
Inventor
Thomas E. McDowell

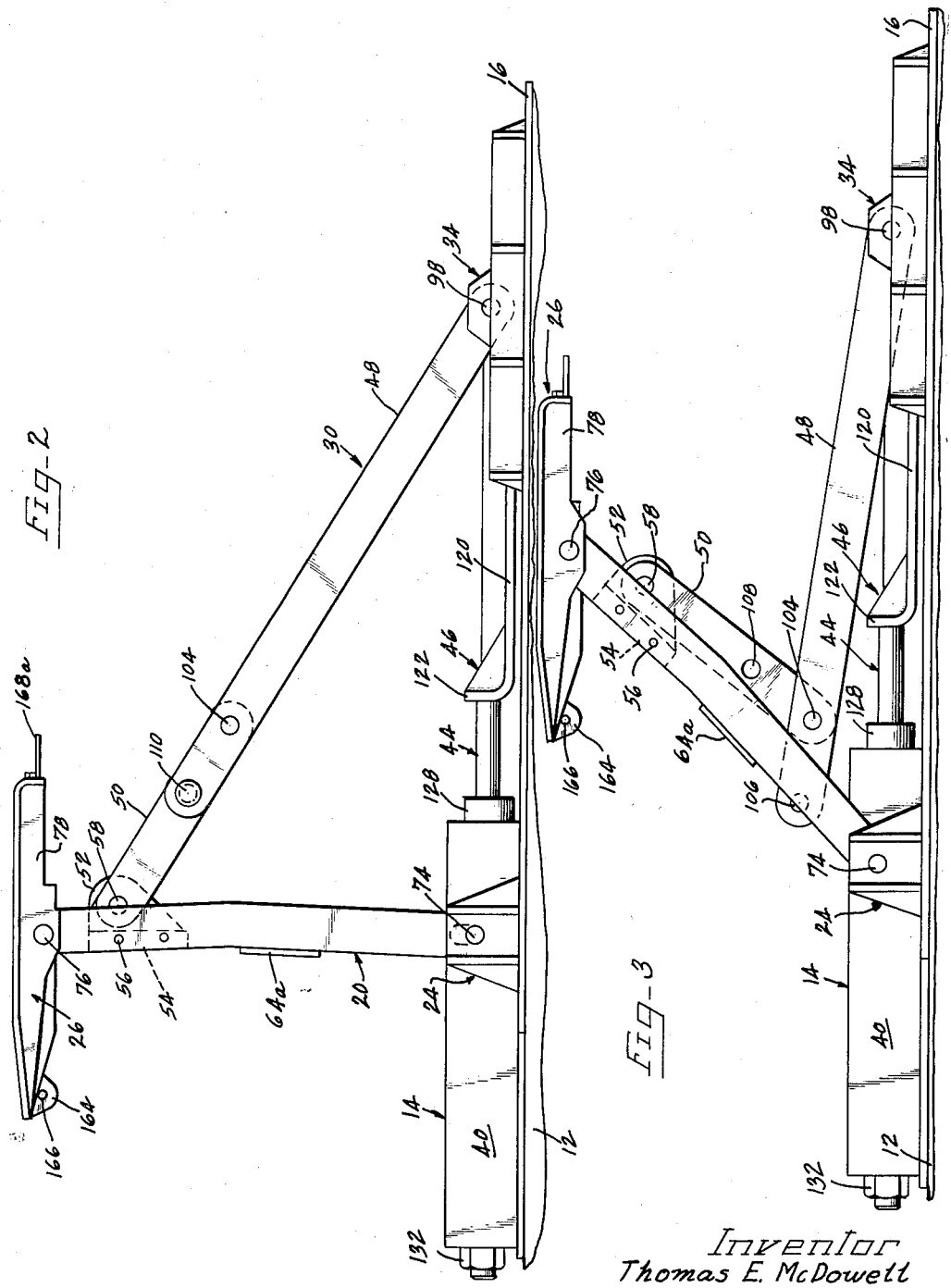

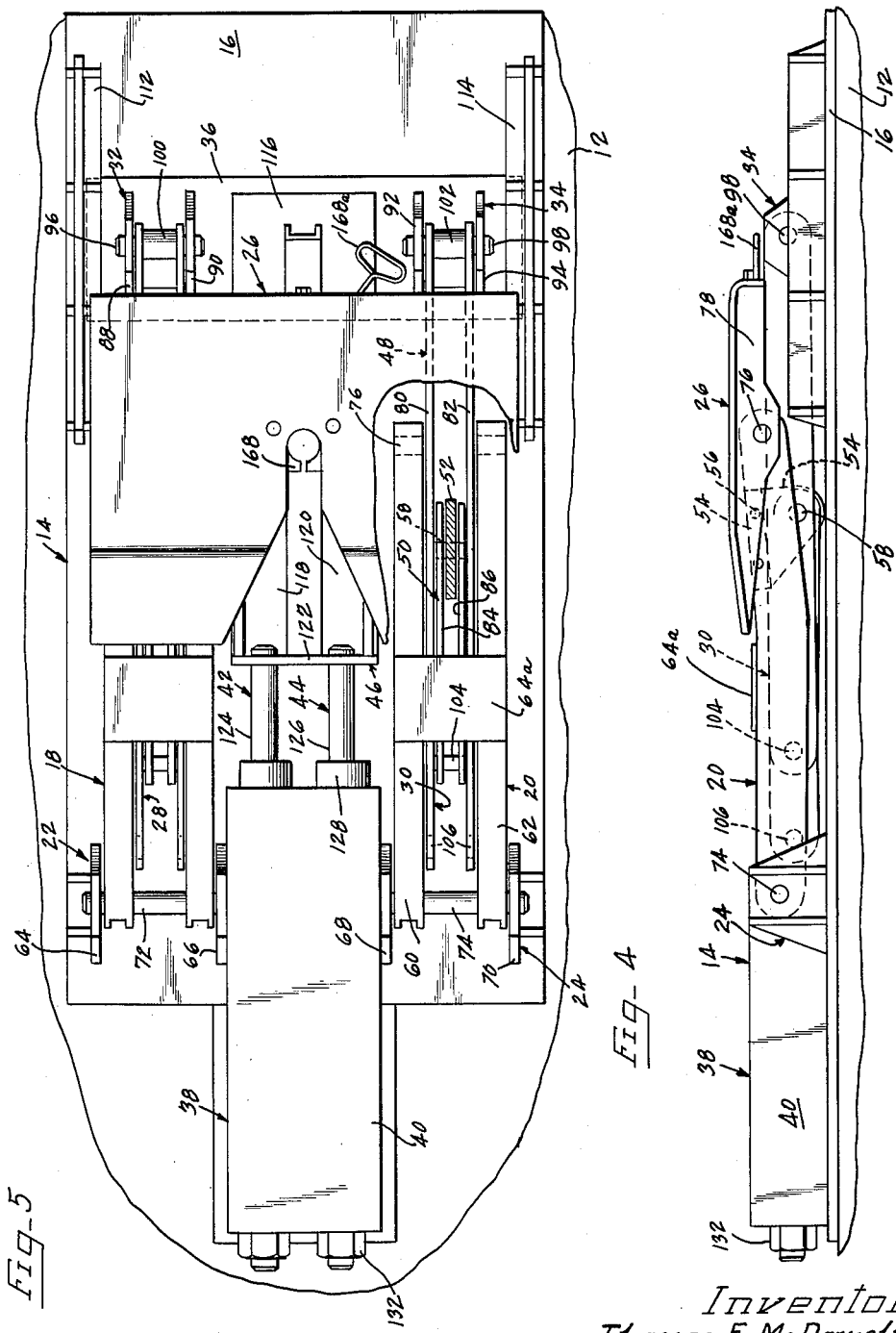

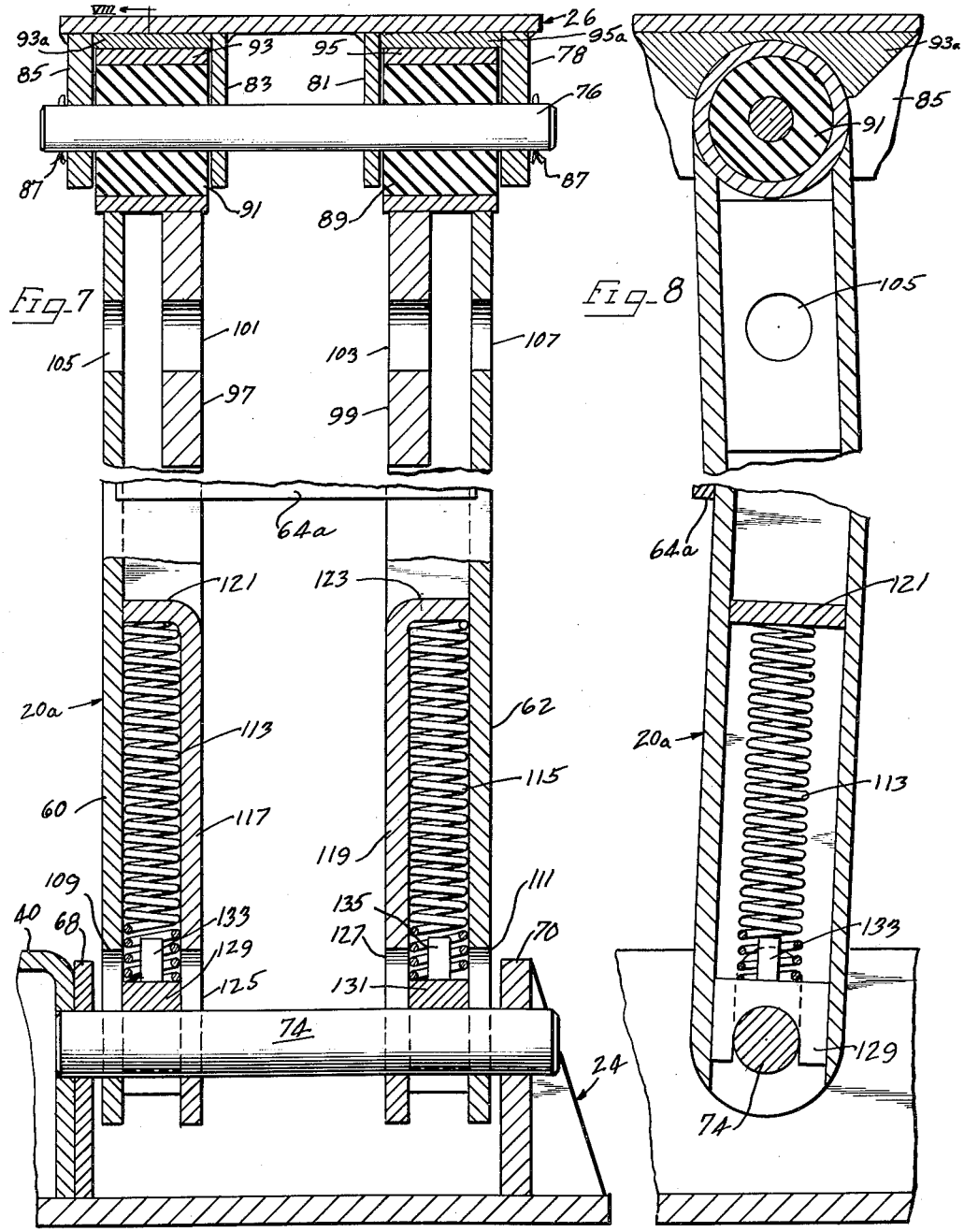

Patented June 26, 1962

3,041,028
TRAILER HITCH
Thomas E. McDowell, Oak Park, Ill., assignor to Brandon Equipment Co., Inc., Chicago, Ill., a corporation of Illinois
Filed Mar. 28, 1960, Ser. No. 18,018
9 Claims. (Cl. 248—119)

This invention relates to a trailer hitch for use in positioning a truck trailer on a flatcar or the like, and more particularly to a collapsible trailer support which may be mounted on a railroad car and moved into and out of supporting relationship with a trailer without difficulty.

Heretofore, various trailer hitches have been provided for the purpose of supporting truck trailers on railroad cars or the like, but these have been objectionable in that they have required a high degree of skill in positioning the trailer for connection to the trailer hitch and a great deal of effort in assembling and disassembling the trailer hitch. Thus, in one form of trailer hitch which has been mounted on a railroad car, it has been necessary to remove connecting pins for support struts for the trailer hitch against the force of the load imposed by the trailer on the support struts.

The present invention resolves these difficulties by providing a trailer hitch for use on a railroad car or the like which is simple and rugged in construction and which may be moved between a load supporting position and a collapsed position without any need for forcibly releasing connecting pins against the load of the trailer. Furthermore, the trailer hitch of the invention provides shock absorber and damping means of an unusually effective form, and permits the trailer to be connected to the fifth wheel of the hitch in a relatively simple manner which does not require extensive maneuvering on the part of a tractor operator.

The trailer hitch of the invention includes a base structure which is secured to the deck of the flatcar, a pair of struts pivoted to the base structure and movable into a vertical load supporting position and a support plate frequently referred to in this art as a "fifth wheel" pivoted to the vertical support struts for receiving the tie pin (also referred to as a "king pin") of the trailer in the usual relationship. A second pair of buttressing support struts are pivoted to the base structure in spaced relationship to the vertical support struts, and in accordance with the invention, these buttressing support struts are of a two-piece construction with a preferably relatively elongated lower portion and a shorter upper portion pivoted to the vertical supports in subjacent relationship to the fifth wheel. The upper portions are pivoted to the lower portions at the lower ends of the upper portions and in predetermined spaced relationship to the upper ends of the lower portions. Mating apertures are formed in the upper and lower portions at the uppermost ends of the lower portions and intermediate the ends of the upper portions of the said buttressing supports, and in accordance with the invention, a holding pin is releasably positioned in the mating apertures when the vertical supports are held in the vertical alignment by the buttressing supports. Thus, the holding or safety pins cooperate with the permanent pivotal connection between the upper and lower portions of the buttressing supports to maintain the said supports in a relatively straight condition wherein they may buttress the load, and the vertical supports are preferably formed with a slight angular configuration or offset to minimize the height of the supports when in collapsed position. When it is desired to disassemble or collapse the trailer hitch, the safety pins are removed from the mating apertures and the buttressing supports then fold over one another into a nested relationship afforded by a spaced double plate construction for each of the said portions, and the vertical supports likewise collapse into nested relationship with the buttressing supports, with the vertical supports also preferably having a spaced double plate construction to receive the buttressing supports therein.

Also in accordance with the invention, shock absorber and damper means are formed on the base plate, and the lower ends of the buttressing supports are pivotally connected to a plate portion slidably mounted on the base plate for taking up shock in the longitudinal direction. Arms or connecting elements are secured to the slidable plate and to the shock absorber and damper means, these means including volute springs and helical springs which are housed in a location which is preferably in register with the pivotal connection between the vertical supports and the base plate.

The trailer may be moved onto the deck of the flatcar from a contiguous surface level with the deck or from surfaces above or below this level, as by a ramp, and either by the trailer or by other means as understood by those skilled in the art, and so that the tie pin of the trailer is in register with the elevated position of the fifth wheel of the trailer hitch with the landing wheels of the trailer being lowered so as to support the weight of the front end of the trailer. The trailer hitch may be elevated after the trailer is in position, and thus the need for complicated maneuvering in connecting the trailer to the hitch is substantially reduced, in comparison with previously available devices. The fifth wheel of the trailer hitch may be raised to its elevated position by connecting a chain or the like to the fifth wheel with the buttressing supports unfolding as the vertical supports approach the upright position thereof. Thereupon the landing wheels are retracted so that the fifth wheel of the trailer hitch carries the weight of the trailer and is in locking engagement therewith. A hook lock of relatively conventional type may be provided for this purpose. At the same time adjustment as to variations in height is effected by compression of springs associated with the vertical supports as described hereinafter. Release of the trailer from the trailer hitch and movement thereof from the railroad car is accomplished in substantially the reverse manner.

It is, therefore, an object of the present invention to provide a trailer hitch for positioning truck trailers on a flatcar or the like which is easily movable from a trailer supporting position to a collapsed position without the need for special skills or tools.

Another object of the invention is to provide a trailer hitch as described wherein the supporting elements are collapsible into a nested substantially flat and highly compact relationship.

Another object of the invention is to provide a trailer hitch having pivotal vertical supports and buttressing supports therefor with the buttressing supports being foldable about a pivot point therein and including connecting means spaced from the pivot point so that the load is taken up at the pivot point to afford easy insertion and removal of the connection means.

Another object of the invention is to provide a trailer hitch having shock absorber and damper means for taking up longitudinal stresses during use.

Other objects and advantages of the invention will become apparent as the description proceeds in accordance with the drawings in which:

On the drawings:

FIGURE 1 is a side elevational view, partly broken away, of a truck trailer positioned on the deck of a railroad flatcar or the like by means of a trailer hitch according to the present invention;

FIGURE 2 is a side elevational view of the trailer hitch of the invention in load supporting position;

FIGURE 3 is a view corresponding to the view of FIGURE 2 and showing the trailer hitch structure in partially collapsed position;

FIGURE 4 is a view corresponding to the view of FIGURE 3 and showing the trailer hitch in fully collapsed position;

FIGURE 5 is a top plan view of the structure shown in FIGURE 4;

FIGURE 6 is an enlarged vertical sectional view of shock absorber and damper means for use in the trailer hitch of the invention;

FIGURE 7 is a vertical sectional view, partly broken away, of vertical support struts according to the invention; and FIGURE 8 is a vertical sectional view taken along the line VIII—VIII of FIGURE 7.

As shown on the drawings:

Referring now to the drawings and to FIGURE 1 in particular, a truck trailer 10 is shown which is positioned on a railroad flatcar 12 by means of a trailer hitch 14 according to the present invention. As seen in FIGURES 2 through 5, the trailer hitch 14 includes a base plate 16 which may be secured to the deck of the flatcar 12 by suitable bolts or the like (not shown), a pair of vertical supports 18 and 20 pivotally secured to the base plate 16 by trunnion means 22 and 24 welded or otherwise secured on said base plate, a "fifth wheel" 26 pivotally mounted at the top of the struts 18 and 20, buttressing support struts 28 and 30 pivotally mounted by trunnion means 32 and 34 to a plate 36 slidably mounted on the base plate 16, with the trunnion means 32 and 34 also being welded or otherwise secured to the said plate 36, and shock absorber means 38 including a housing 40 secured to the base plate 16 and housing shock absorber and damper means 42 and 44 which are connected to the plate 36 by bracket means 46.

In accordance with the invention, the struts or buttressing supports 28 and 30 are formed in two sections, as illustrated with respect to the strut 30, with the lower portions 48 being relatively elongated with respect to the upper portions 50. The upper portions 50 are secured to the vertical supports 18 and 20 by brackets or the like 52 which may be formed integrally on spacer blocks 54 riveted at 56 and pivoted to the portions 50 by bolts or pins 58. The struts or vertical supports 18 and 20 are preferably formed of parallel elongated channel plates 60 and 62, as seen with respect to the support 20, which are spaced apart by spacer blocks or the like 64a to receive the struts 28 and 30 therebetween as shown in FIGURE 5. The trunnion means 22 and 24 may include upstanding ears 64, 66, 68 and 70 welded or otherwise secured to the base plate 16 retaining journal shafts 72 and 74, on which the respective supports 18 and 20 are pivoted, the upper ends of the supports 18 and 20 being pivoted to the fifth wheel or support plate 26 by suitable journal shafts or the like 76 received in flange means 78 on the fifth wheel.

As seen in FIGURES 7 and 8, further flange means 81, 83 and 85 also receive the shafts 76, with cotter pins 87 securing the shafts in position. The journal shafts 76 are mounted in rubber bushings 89 and 91 between the respective depending flanges 78 and 81 and 83 and 85, which are secured in sleeves 93 and 95 at the upper ends of the channel plate portions 60 and 62. The sleeves 93 and 95 rest against bearings 93a and 95a having complementary arcuate bearing surfaces, so that the bushings 89 and 91 are normally not working to take up unusual stresses; however, side sway during transit will cause one side or the other to tend to lift. If the weight of the load is overcome in this process, therefore, the rubber bushing on the given side will come into play so that the strain from such side sway is taken off the king pin 160. Channel inserts 97 and 99 may be secured in the said channel plate portions 60 and 62 and the inserts define openings 101 and 103 in register with openings 105 and 107 in the channel plate portions to receive pin means or the like, it being understood that the brackets 52 shown in FIGURES 1 through 5 may also be used to connect the struts 28 and 30.

The lower ends of the channel plate portions 60 and 62 define axially elongated openings 109 and 111 respectively to receive the journal shaft 74, and in order to afford resilient mounting for the channel plate portions forming the struts 18 and 20, spring means are provided comprising helical springs 113 and 115 which are received in bracket inserts 117 and 119 having inwardly extending top walls 121 and 123 forming upper bearing surfaces for the springs. The brackets 117 and 119 may be fixedly secured in the channel plate portions by welding or otherwise, and at their lower ends define openings 125 and 127 of complementary configuration with the openings 109 and 111 and in register therewith, the said openings 109 and 111 and 125 and 127 affording vertical movement of the struts 18 and 20 relative to the journal shafts 72 and 74. Semi-circular bearings such as 129 and 131 are mounted on the said journal shafts and are preferably provided with upstanding pins 133 and 135 entering the lower ends of the springs 113 and 115, which are thus supported at their lower ends on the bearings 129 and 131. The springs thereby accommodate a variety of trailer heights. Thus, after coupling, the trailer is lowered so that shaft 74 is at the top of slots 109, 111 and 125 and 127. Without this spring feature of the invention, the trailer under load would have to be adjusted to the proper height, with a consequent costly expenditure of time and effort. Further, these springs may provide a reduction in vertical stresses on the trailer from bumps or the like during transit.

The portions 48 and 50 of the buttressing support struts 28 and 30 likewise have a double plate construction, with the lower plates 80 and 82 of the portions 48 being adapted to fit within the portions 60 and 62 of the struts 18 and 20 and to receive therein plate portions 84 and 86 forming the upper portions 50, also as shown in FIGURE 5. Thus, the lower ends of the portions 48 may be secured to the respective trunnion elements 32 and 34 by means of upstanding ears 88, 90, 92 and 94 welded or otherwise secured to the plate 36, and shafts 96 and 98 in the said ears, and spacer blocks 100 and 102 may be interposed between the plates 80 and 82 of the respective lower shaft portions 48.

The lower and upper portions 48 and 50 of the struts 28 and 30 are pivotally connected by bolts or the like 104 which are disposed adjacent the lower ends of the upper portions 50 and in spaced relation to the upper ends of the lower portions 48. In order to provide for selective positioning of the buttressing supports 28 and 30 in load receiving relation to the vertical supports 18 and 20, as shown in FIGURE 2, mating apertures are formed in the portions 48 and 50 as seen at 106 and 108 in FIGURE 3. Thus when the portions 48 and 50 are extended or unfolded so that the portions 48 and 50 are in coaxial alignment, the apertures 106 and 108 are disposed in register and a bolt or pin 110 may be removably inserted into the said apertures 106 and 108, thereby to maintain the said coaxial alignment of the portions 48 and 50 and to maintain the supports 18 and 20 in their vertical position so that the fifth wheel 26 may support the trailer 10, as hereinafter further described.

In previously available devices, great difficulty has been experienced in removing a connecting element from a trailer hitch to permit disassembly relative to the trailer. The double connecting structure of the invention obviates this difficulty, since the load imposed by the trailer 10 on the fifth wheel 26, the vertical supports 18 and 20, and the upper portions 50 of the supports 28 and 30 is transmitted through the pins 104 to the lower portions 48 while the pins 110 prevent relative folding of the upper and lower portions 48 and 50 without axial shear stress interfering with selective removal of the pins 110. Thus, the pins 110 may be easily extracted from the openings 106 and 108, which desirably have a relatively larger diameter than the pins 110, without the need for hammering and protracted effort such as has been necessary to remove the safety pins or the like from buttressing struts under load in the prior art devices. Conversely the connection of the pins 104 with the portions 48 and 50 may be relatively snug so as to maintain the load translation through this juncture.

Further in accordance with the invention, longitudinal loads imposed on the trailer during transit are absorbed and damped by the means 38 coacting with the supports 28 and 30 as locked in load supporting position by the means 104 and 110. The plate 36 is slidably received in guide plates or the like 112 and 114 which are formed at opposite sides of the plate 16. The bracket structure 46 is secured to the plate 36 in any suitable manner as by welding thereto an intermediate plate 116 or the like, and desirably includes a pair of forwardly and upwardly extending flanges 118 and 120 joined by a cross plate 122. The plate 122 has secured thereto individual shock absorber rods 124 and 126 forming stress transmitting means for the means 42 and 44 respectively.

As seen in FIGURE 6 with respect to the shock absorber means 44, the rods such as the rod 126 may extend through the housing structure 40 and are provided with an abutment boss 128 at the end adjacent bracket structure 46, and are threaded at the other end thereof as indicated at 130 for receiving a suitable nut element 132. Abutment plates or rings 134 and 136 are held in abutting relationship with the abutment shoulder 128 and the nut 132 by shock absorber and damper spring means which urge the plates or rings 134 and 136 against retainer elements 138 and 140 respectively at the opposite ends of the housing 40.

The shock absorber and damper means 38, in the embodiment shown, includes volute springs 142 and 144 on the rods such as rod 126, the volute spring means being spaced by bearing plates or rings 146 and 148 from inner pairs of relatively large helical springs 150 and 152 coaxially surrounding inner pairs of relatively small helical springs 154 and 156 on the rods, and spaced from one another by a central abutment ring 158. By the use of volute springs, a high absorption of impact energy is effected and at the same time violent recoil action which might damage the trailer or lading is avoided. It will therefore be seen that a load or stress urging the rods to the right will be damped by the volute spring means 142 and 144, while the shock absorber springs 150 through 156 will take up shock in both directions and reduce vibration to a desirable minimum. As a result, no unwarranted stress is placed on the struts 28 and 30 or on the pin connections 58, 98 or 104 during use, and stresses between the trailer 10 and the trailer hitch 14 are held to a desirably low level.

In operation, the trailer 10 may be loaded on the flatcar 12 by the tractor or otherwise, so that the tie pin 160 thereof is in position to register with the fifth wheel 26. Thereupon, the landing wheels 162 of the trailer are lowered onto the deck of the flatcar 12, so that the front end of the trailer is supported with the tractor withdrawn. The tractor will then engage a depending lug 164 on the fifth wheel of the hitch by passing a chain or the like through an aperture 166 in the said lug thereby to draw the fifth wheel upwardly into position. However, it will be understood that the tractor need not be used for this purpose, since the parts are formed for readily pivotal movement, and the device may be raised to an elevated position by other suitable mechanisms. When the supports 18 and 20 have been raised to their vertical position as shown in FIGURE 2, and the fifth wheel or support plate automatically locked to the king pin 160, the pins 110 are slipped into position through the apertures 106 and 108, and the landing wheels 162 are retracted so that the hitch carries the entire weight of the front wheel of the trailer. A hook lock member 168 is provided to lock the tie pin 160 and the fifth wheel structure 26. This hook lock member may be released by manual release lever 168a in a usual manner.

Disconnection of the trailer hitch from the trailer may be accomplished in substantially the reverse sequence from the procedure for assembly and hitching and, as indicated, the pins 110 may be readily drawn from the apertures 106 and 108 in the supports 28 and 30 as a result of the take-up of load by the pins 104 connecting the portions 48 and 50, after the landing wheels of the trailer have been extended to support the trailer. Thereupon the tractor is used to push the hitch to collapsed position, shown in FIGURE 4, the lower portions 48 of the bars 28 and 30 pivoting downwardly and the upper portions 50 folding into the lower portions 48 as illustrated in FIGURE 3. The upper portions 50 in turn will be nested within the supports 18 and 20, the fifth wheel 26 pivoting into overlying protective relation with the supports so that an unusually compact storage position is afforded. It will also be seen in this connection that the slightly angled or offset configuration of the struts 18 and 20 permits the fifth wheel to assume a horizontal position in its collapsed condition, as shown in FIGURE 4, thus minimizing the height of the collapsed structure.

There has thus been provided a trailer hitch which is usually simple, yet rugged and effective. The complicated maneuvering of the trailer necessary with previous trailer hitches is eliminated, and the hitching and unhitching of the trailer is accomplished in a manner which requires no special tools, skills or techniques, with a consequent having in labor and space. It will be seen, therefore, that the device may be used to advantage in a wide variety of applications where a heavy load is to be supported with a minimum of impact shock during starting and stopping or the like and with a high degree of reliability in use.

Although I have herein set forth and described my invention with respect to certain specific principles and details thereof, it will be understood by those skilled in the art that these may be varied without departing from the spirit and scope of the invention as set forth in the hereunto appended claims.

I claim as my invention:

1. A load supporting device comprising a first support having an upper end adapted to support a load and a lower end, fixed means pivotally supporting said lower end, a second support including a first section pivotally connected to said first support adjacent the upper end thereof, a second section and pivot means connecting said second section to said first section intermediate the ends of said second section, means releasably connecting said sections above said pivot means for bypassing axial loads to said pivot means, means slidably and pivotally supporting the lower end of said second section, and shock absorber means connecting said means slidably and pivotally supporting the lower end of said second section to said fixed means pivotally supporting the lower end of said first support.

2. A load supporting device comprising a first support adapted to support a load at one end thereof, a second support including a first section pivotally connected to said first support, a second section and pivot means connecting said second section to said first section intermediate the ends of said second section, means releasably connecting said sections spaced from said pivot means while bypassing axial loads to said pivot means, fixed means pivotally supporting the other end of said first support and maintaining said other end of said first support against slidable movement relative to a support surface, means pivotally and slidably supporting the lower end of said second section in spaced relation to the other end of said first support and affording slidable movement of the lower end of the second section relative to the other end of the first support and to a support surface and damper means connecting said means pivotally supporting the other end of said first support and said means pivotally and slidably supporting the lower end of said second section.

3. A load supporting device comprising a first support adapted to support a load at one end thereof, a second support including a first section pivotally connected to said first support, a second section and pivot means connecting said second section to said first section intermediate the ends of said second section, means releasably connecting said sections spaced from said pivot means while bypassing axial loads to said pivot means, fixed means pivotally supporting the other end of said first support and maintaining said other end of said first support against slidable movement relative to a support surface, means pivotally supporting the lower end of said second section and affording slidable movement of the lower end of the second section relative to the other end of the first support and to a support surface, and shock absorber means and damper means, said shock absorber means and damper means connecting said means pivotally supporting the other end of said first support and the lower end of said second section to afford controlled impact adjustment therebetween.

4. A load supporting device for use in supporting trailers on flatcars or the like comprising a base, a first support strut having one end pivotally secured to said base, a fifth wheel structure pivotally secured to the other end of said first support strut, a second support strut having a first portion pivotally secured to said first support strut adjacent said other end thereof and a second portion, means pivotally connecting said first and second portions intermediate the ends of said second portion, means releasably connecting said first and second portions spaced from said means and bypassing axial load forces in said second support strut to said means pivotally connecting said first and second portions, means slidably mounted on said base and pivotally supporting said second portion in spaced relation to said first support strut, and shock absorber means on said base adjacent said first support strut connected to said slidably mounted means for absorbing impact loads and the like imparted to said second support strut.

5. A load supporting device for use in supporting trailers on flatcars or the like comprising a base, a first support strut having one end pivotally secured to said base, a fifth wheel structure pivotally secured to the other end of said first support strut, a second buttressing strut having a first portion pivotally secured to said first support strut adjacent said other end thereof and a second portion, means pivotally connecting said first and second portions intermediate the ends of said second portion, means releasably connecting said first and second portions and bypassing axial load forces in said second support strut to said means pivotally connecting said first and second portions, means slidably mounted on said base and pivotally supporting said second portion in spaced relation to said first support strut, and damper means secured to said base adjacent said first support strut and connected to said slidably mounted means for absorbing impact loads and the like imparted to said second support strut.

6. A shock absorber and damper comprising damping means including a volute spring, shock absorber means including a large helical spring and a concentric, inner small helical spring, abutment means between said volute spring and said helical springs, a rod extending coaxially through said volute and helical springs, abutment means on said rod abutting an outside end of said volute spring and fixed means coacting with said abutment means to restrain axial movement of said volute and helical springs relative thereto.

7. A load supporting device for use in supporting trailers on flatcars or the like comprising a base, a strut, buttressing means pivotally secured to said strut and said base, an axially elongated slot in a lower end of said strut, a shaft mounted on said base and pivotally and slidably received in said slot, a spring, means retaining said spring on said strut for bearing engagement with said shaft, and a support plate at the upper end of said strut, said spring accommodating trailers of different heights which may be coupled to said support plate without complex adjustments being required.

8. A load supporting device for use in supporting trailers on flatcars or the like comprising a base, a pair of struts connected to said base, a support plate for supporting a trailer and spaced pairs of depending brackets, a shaft in said brackets, a sleeve formed at the upper end of each of said struts received in each of said pairs of brackets, a resilient bushing in each of said sleeves snugly receiving said shaft therethrough, and a bearing member in each of said pairs of brackets engaging the upper surface of each of said sleeves, whereby twisting movement of said shaft resulting from side sway or the like when the device is supporting a trailer in transit is taken up by one or the other of said bushings to relieve strain on said king pin.

9. In a trailer support device for use in positioning a truck trailer or the like on a railroad car, a first support, means for pivotally securing one end of said first support to the railroad car, plate means on the other end of said first support pivotally connected thereto for pivotal adjustment around an axis perpendicular thereto, a second support having first and second sections, one end of the first section being pivotally connected to the first support adjacent said other end of the first support, means for pivotally securing one end of the second section to the railroad car in spaced relation to said one end of said first support, means pivotally connecting said sections at a point spaced from the other end of the second section and adjacent the other end of the first section so as to transmit loads axially through said second support and means releasably connecting the other end of the first section and the other end of the second section and spaced from said means pivotally connecting said sections in the direction of said one end of said first section, and freely received in said sections to prevent substantial axial loads from being imposed thereon and to afford easy release thereof for selectively folding said sections about said means pivotally connecting said sections.

References Cited in the file of this patent

UNITED STATES PATENTS

| | | |
|---|---|---|
| 1,073,516 | Petersen | Sept. 16, 1913 |
| 1,380,490 | Masury | June 7, 1921 |
| 1,423,643 | Buchan | July 25, 1922 |
| 1,427,060 | Broussouse | Aug. 22, 1922 |
| 1,816,897 | Fedderman | Aug. 4, 1931 |
| 1,820,950 | Schulstadt | Sept. 1, 1931 |
| 2,036,344 | Menhall | Apr. 7, 1936 |
| 2,796,712 | Miller | June 25, 1957 |
| 2,880,681 | Markestein | Apr. 7, 1959 |
| 2,937,040 | Hutton | May 17, 1960 |